Figure 1:
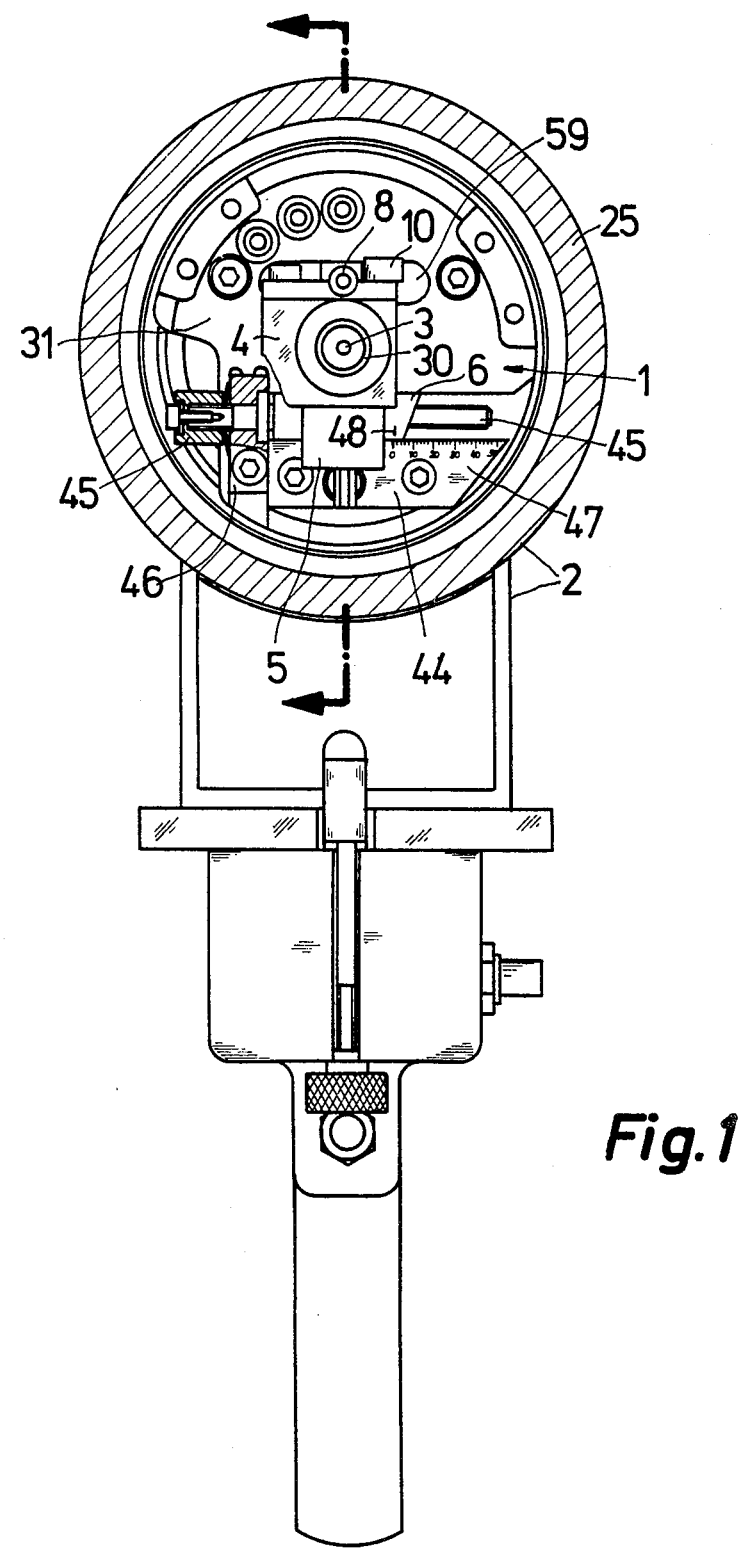

United States Patent [19]

Reeh et al.

[11] Patent Number: 4,467,175
[45] Date of Patent: Aug. 21, 1984

[54] ADJUSTMENT ASSEMBLY FOR THE ROTARY TORCHHEAD OF AN ELECTRICAL WELDING GUN

[75] Inventors: Holger Reeh, Germering; Josef Geiss, Haar, both of Fed. Rep. of Germany

[73] Assignee: Mathilde Reeh, Germering, Fed. Rep. of Germany

[21] Appl. No.: 375,289

[22] PCT Filed: Aug. 28, 1981

[86] PCT No.: PCT/DE81/00132

§ 371 Date: Apr. 26, 1982

§ 102(e) Date: Apr. 26, 1982

[87] PCT Pub. No.: WO82/00788

PCT Pub. Date: Mar. 18, 1982

[30] Foreign Application Priority Data

Aug. 28, 1980 [DE] Fed. Rep. of Germany ....... 3032602

[51] Int. Cl.³ ............................................. B23K 9/28
[52] U.S. Cl. .......................... 219/137.31; 219/125.11; 219/60.2
[58] Field of Search ............ 219/137.2, 137.31, 137.8, 219/124.1, 74, 137.63, 137.9, 60.2, 125.11, 125.12

[56] References Cited

U.S. PATENT DOCUMENTS

| | | | |
|---|---|---|---|
| 3,621,182 | 11/1971 | Peyrot | 219/60 A X |
| 3,754,114 | 8/1973 | Peyrot | 219/74 |
| 4,072,828 | 2/1978 | Thome | 219/137.31 |
| 4,292,495 | 9/1981 | Saito et al. | 219/125.12 |

*Primary Examiner*—Roy N. Envall, Jr.
*Assistant Examiner*—Catherine M. Sigda
*Attorney, Agent, or Firm*—Jackson, Jones & Price

[57] ABSTRACT

Adjustment assembly for the rotary torch head of an electrical welding gun having a torchholder (4) supporting the welding electrode (3) and a filling wire nozzle (8) at the end of a wire feed tube (9) held in a swivel holder (11) arranged on torchholder (4) so as to be swivellably adjustable about swivel spindle (10) of filler wire nozzle (8). Torchholder (4) is swivellably adjustably held on longitudinal slide (5) about its swivel spindle (7), slide (5) being adjustably guided on a cross-slide (6) parallel to the rotation axis of the torch head. For fixing the clearance of the adjusting devices, a spring can be secured between the back of the torchholder (4) and drive shaft (15) of the torch head. The spring can be formed by the wire feed tube (9), which is secured so as to be resiliently bent out between filler wire nozzle (8) and torch head drive shaft (15).

8 Claims, 8 Drawing Figures

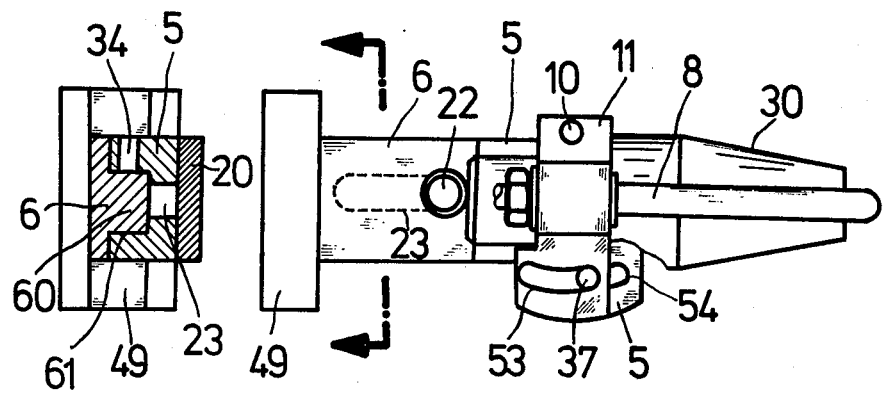
Fig. 5
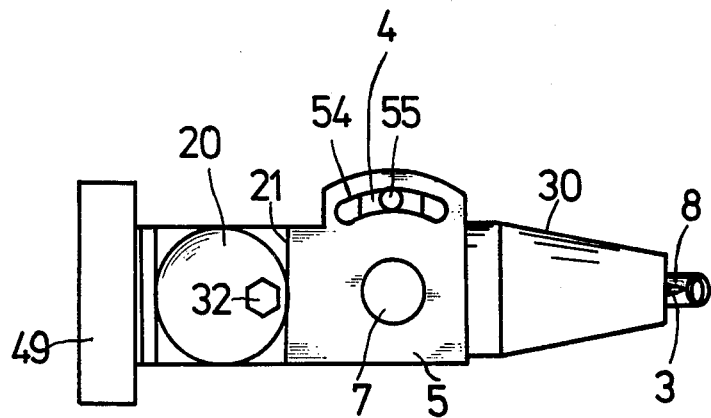
Fig. 7
Fig. 6

ADJUSTMENT ASSEMBLY FOR THE ROTARY TORCHHEAD OF AN ELECTRICAL WELDING GUN

The present invention relates to an adjustment assembly for the rotary torchhead of an electrical welding gun.

Such welding guns are used for welding pipes, the torchhead generally rotating about the pipe axis. In order that the welding electrode can be adjusted to the pipe diameter relative to the rotation axis of the torchhead, the torchholder which carries the welding electrode and optionally its inert gas nozzle, is transversely adjustable by means of a cross slide rotatable with the torch head for the radial adjustment of the welding electrode. To enable the setting angle to be adjusted with respect to the weld it is possible to swivellably adjust the torchholder with the welding electrode about an axis at right angles to the adjustment direction of the cross slide and the rotation axis of the torchhead. The welding electrode torchholder must also be axially adjustable in order to regulate the electrode spacing from the weld. Furthermore welding guns for welding with a welding filler wire also have a welding wire nozzle issuing at the electrode tip, which is adjustable with the same adjustment directions as the electrode and is also swivellably adjustable relative to the latter about an axis which is perpendicular thereto, so that the filler wire can, as required, be supplied with a different spacing laterally of the electrode tip.

To ensure that the adjustment assembly which realizes all these adjustments does not become too complicated and badly arranged in known welding guns of the aforementioned types the adjustment devices for the torchholder and of the filler wire nozzle are operationally separated from one another. However, this means that the filler wire nozzle must be separately reset following every adjustment of the torchholder.

The invention solves the problem of providing an adjustment assembly which only requires a minimum number of adjustment devices for the torchholder and the filler wire nozzle and on which no separate resetting of the filler wire nozzle after an adjustment of the torch holder is required, but is possible for modifying the relative position of the said nozzle with respect to the welding electrode.

Since, according to one aspect of the invention, the swivel holder of the filler wire nozzle is supported in a swivellably adjustable manner on the torch holder and the latter is in turn swivellably adjustable about its swivel axis, is longitudinally adjustable in the axial direction of the welding head and transversely adjustable in the radial direction of said head, all three adjustment movements are transferred to the filler wire nozzle, so that resetting thereof, except for modifying its relative position from the welding electrode is unnecessary. In most cases the filler wire nozzle remains in the same relative position to the welding electrode once it has been fixed for comparable, repeating welding functions. The invention simplifies adjustment and this operation can be carried out in a significantly shorter time. As the welding electrode and filler wire nozzle are adjusted together, the precision of adjustment is also increased, which in turn improves the welding quality. Furthermore, as in connection with the filler wire nozzle there are no separate adjustment devices for the radial adjustment, axial adjustment and swivelling adjustment in the case of a constant relative position of nozzle and electrode, the adjustment assembly can be easily supervised, can be given a compact constructional size and can be housed in a readily accessible manner in the confined space of a welding gun head, whilst at the same time being easy to operate.

As a result of employment of a spring, the bearing play of all the adjustment devices in the axial direction is substantially eliminated, so that the precise reproducibility of the adjustment processes is assisted. The spring is formed by the wire guide tube which can be resiliently bent outwards and in this way passes within the hollow shaft portion of the drive shaft and can follow all the adjustments of the adjustment assembly, it is not only possible to obviate the need for a separate spring with its support device, but there are also no sharp bends and deflections in the wire feed tube, which facilitates the insertion of the filler wire into its nozzle and the advance of said wire.

In connection with the axial adjustment the bending out of the wire feed tube forms a storage loop which bridges the adjustment path. The wire feed tube constructed in a resiliently bendable manner can in particular be a helical spring, whose spring coils rest on one another when the feed tube is in its extended position, without leaving any significant gaps.

In addition to being swivellably adjustable relative to the welding electrode, the wire feed nozzle can easily be longitudinally adjusted. The lock nut on the screwed shank of the wire feed nozzle serves as an end stop defining the set position of said nozzle.

The setting device of the longitudinal slide in the form of an eccentric disk permits a high adjustment precision in the case of limited constructional dimensions. An operating head, e.g. a square member is provided at the end of the eccentric pin or in the extension thereof on the side of the eccentric disk remote therefrom on which the eccentric disk can be rotated about the eccentric pin axis for the longitudinal adjustment of the longitudinal slide.

Corresponding scales are preferably provided for all the adjustment devices. The additional scale is advantageous because as a result the radial spacing of the electrode tip cooperating as an indicator with the scale with respect to the rotation axis of the torchhead can still be read off if after a corresponding swivelling adjustment of the torchholder the welding electrode forms an angle with the axial direction and consequently the numerical value read off on the cross slide no longer coincides with the actual radial spacing of the electrode tip relative to the rotation axis of the torch head.

The invention is described in greater detail hereinafter relative to non-limitative embodiments and the attached drawings, of which:

FIG. 1 a part sectional front view of an electrical welding gun from the front.

Figure 2:
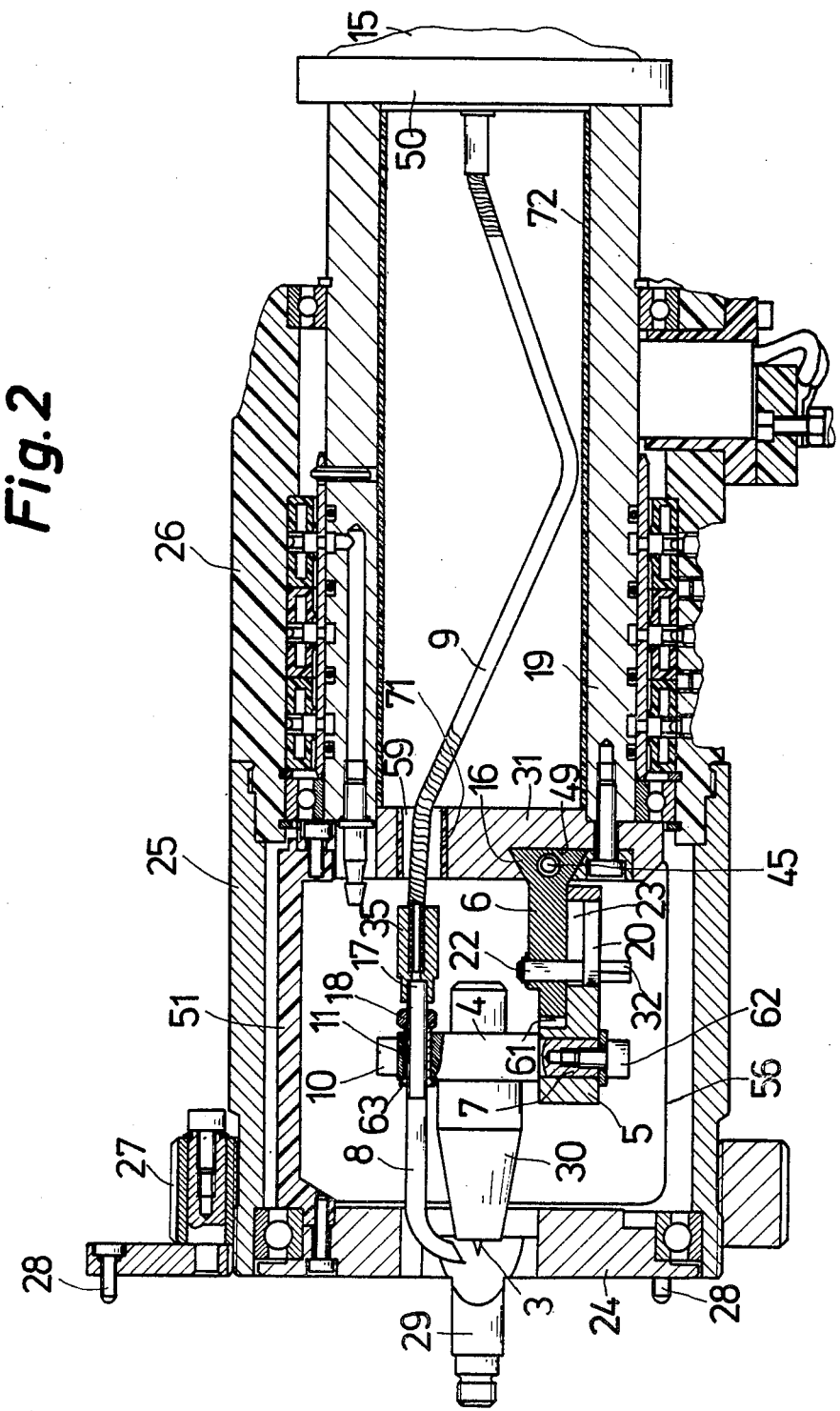

FIG. 2 the longitudinal section through the front part of the welding gun tube containing the torchhead in accordance with the intersection line in FIG. 1, parts of the adjustment assembly for adjusting the torch being shown in cross-section.

Figure 3:
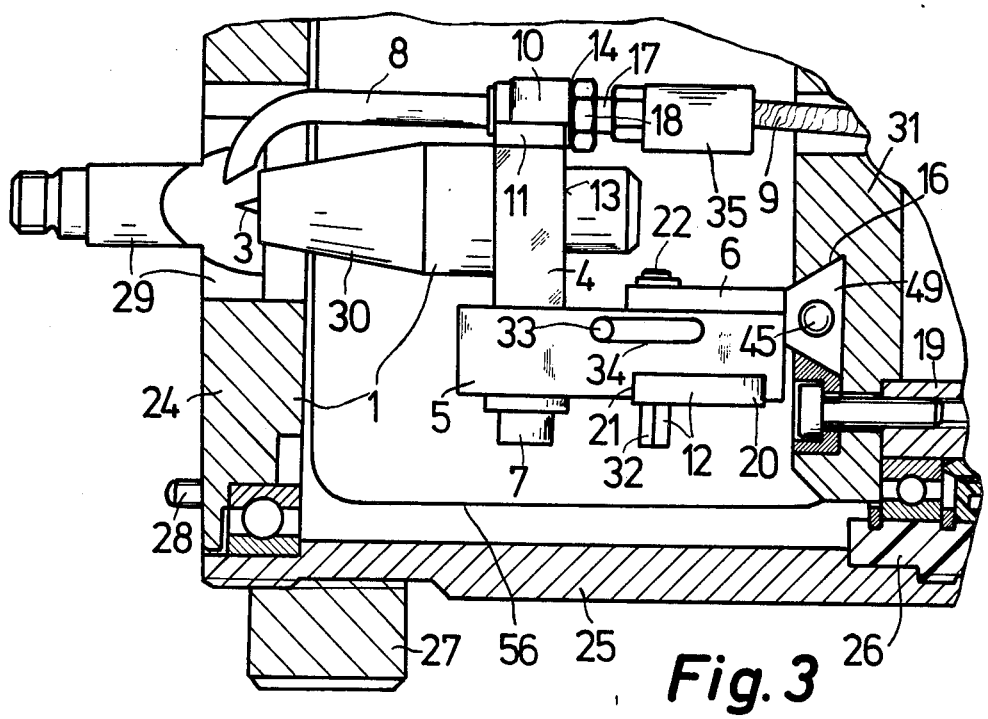

FIG. 3 a side view corresponding to FIG. 2 of the adjustment assembly in an external view.

Figure 4:
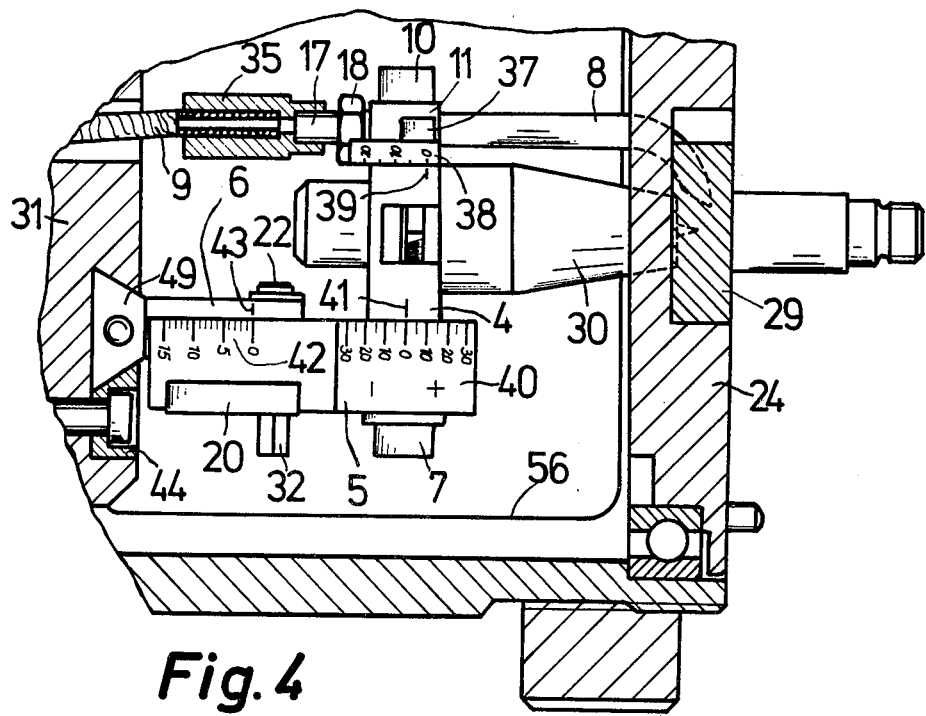

FIG. 4 a side view of the adjustment assembly in the outside view from the opposite side to FIG. 3.

FIG. 5 a plan view of the adjustment assembly corresponding to the view from the top in FIG. 4.

FIG. 6 a corresponding view of the adjustment assembly from below in FIG. 4.

FIG. 7 the cross-section corresponding to the intersection line in FIG. 5.

Figure 8:
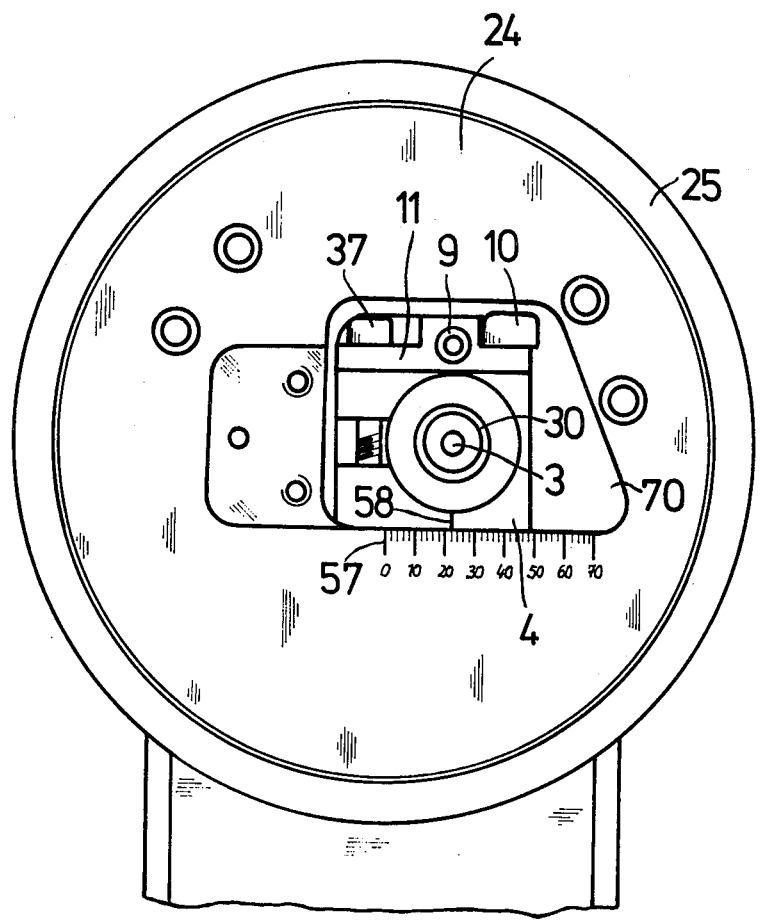

FIG. 8 the front view of the torchhead.

Torchhead 1 is located at the front end of tubular casing 25, 26 of electrical welding gun 2. Head 1 is rotatably driven about the tubular casing axis and has a welding electrode 3 and an inert gas nozzle 30 surrounding the latter, together with a filler wire nozzle 8 through which the filler wire supplied by a wire feed tube 9 is fed to the welding electrode 3. Welding electrode 3 with inert gas nozzle 30 and filler wire nozzle 8 are jointly swivellably adjustable in a plane containing the rotation axis of torchhead 1 radially and axially to the rotation axis of the latter and about a swivel axis at right angles to said rotation axis. In addition, the filler wire nozzle is longitudinally and swivellably adjustable relative to welding electrode 3. Torchhead 1 has an adjustment assembly for these adjustments which serves to support electrode 3 with its inert gas nozzle 30 and the filler wire nozzle 8 on a front plate 31 (FIG. 2) flanged to the front end of a hollow shaft portion 19 of drive shaft 15.

The adjustment assembly has a cross slide 6, whose slide base 49 is longitudinally adjustable in a guidance slot 16 of front plate 31 by means of an adjusting spindle 45, this taking place parallel to a radial plane of the torchhead. A longitudinal slide 5 is adjustable parallel to the rotation axis of the torchhead on cross slide 6. On longitudinal slide 5 a torch holder 4 receiving welding electrode 3 with its inert gas nozzle 30 is swivellably adjustable about a spindle 7 perpendicular to the rotation axis of the torchhead and to the adjustment direction of cross slide 6. A swivel holder 11 for the filler wire nozzle 8 is swivellably adjustably supported on torchholder 4 about a swivel spindle 10 parallel to swivel spindle 7 of holder 4.

The filler wire nozzle 8 is also longitudinally adjustable in swivel holder 11. The coupling end of the wire feed tube 9 is screwed to the rear end of its shaft and passes in non-contacting manner through a slot 59 in front plate 31. The wire feed tube 9 is flexible and passes in bent out form in the hollow shaft portion 19 of drive shaft 15, so that it can follow all the adjustment movements of filler wire nozzle 8.

The adjusting spindle 45 of cross slide 6 passing through slide base 49 is supported in a spindle socket 46 (FIG. 1), which is fixed to front plate 31. As can be gathered from FIGS. 3 to 7 cross slide 6 is cross-sectionally T-shaped and with its T-base forms a guide rib 60 (FIG. 7) which slidingly fits into a guidance slot 61 formed along the longitudinal slide 5. A guidance oblong hole 34 passes in one side wall of guidance slot 61 in longitudinal slot 5 and parallel to slot 61 for a guide pin 33 (FIG. 3) laterally screwed into guide rib 60 of cross slide 6 and which is formed by the shank of a setscrew which can be used for fixing the longitudinal slide to the cross slide in the set position. The base of guidance slot 61 also has a guidance slit 23 through which slidingly projects an eccentric pin 22 of an eccentric disk 20 which with the latter forms the setting device 12 for setting longitudinal slide 5 relative to cross slide 6. Eccentric pin 22 is rotatably mounted in a bore (FIG. 2) of cross slide 6 and is axially fixed to cross slide 6 by means of a circlip at the free end of eccentric pin 22. Eccentric disk 20 is slidingly received in a transverse slot 21 (FIG. 6) in the bottom of longitudinal slide 5 remote from guidance slot 61, so that the peripheral edge thereof engages on the lateral faces of transverse slot 21. Longitudinal slide 5 and cross slide 6 are held together by means of eccentric disk 20 and guidance pin 33 and the lateral flanges thereof slidingly engage on the longitudinal slide 5 on the side thereof remote from transverse slot 21 of slide 5. An operating head 32 in the form of a square member for adjusting eccentric disk 20 about its eccentric pin 22 and therefore for the longitudinal adjustment of longitudinal slide 5 relative to cross slide 6 by the cooperation of the circumferential surface of disk 20 with the side walls of transverse slot 21 is formed coaxially with pin 22 on the side of disk 20 remote from the latter.

Torchholder 4 with its swivel spindle 7 is supported in a swivellably adjustable manner on the end of longitudinal slide 5 remote from cross slide 6. At a distance from swivel spindle 7 a circular segmental oblong hole 54, whose centre of curvature coincides with swivel spindle 7 is formed in longitudinal slide 5. A guidance pin 55 of torchholder 4 formed by the shank of a setscrew is slidingly mounted in oblong hole 54. An adjusting screw 62 (FIG. 2) for the axial fixing of swivel spindle 7 rotatable in the longitudinal slide is fitted at the free end of said spindle.

Above the electrode 3 secured in torchholder 4 with the inert gas nozzle 30, swivel holder 11 is swivellably adjustably supported on torchholder 4 about a swivel spindle 10 parallel to swivel spindle 7 of holder 4.

At a distance from swivel spindle 10 a circular segmental oblong hole 53 (FIG. 5) is formed in swivel holder 11, whose centre of curvature coincides with swivel spindle 10 and through which passes the locking screw 37 making it possible to detachably secure the torch in torchholder 4 and which simultaneously serves to fix the swivel holder 11 in its particular swivel position.

Swivel holder 11 has a bore in which is located an insulating bush 63 (FIG. 2), through which is passed the filler wire nozzle 8 formed by a copper tube together with its screw shank 17 so as to be electrically insulated from torch holder 4 which, during welding is at the welding voltage. The end of screw shank 17 of nozzle 8 is screwed to a coupling sleeve 35 in which is fixed the associated end of the wire feed tube 9. Between coupling sleeve 35 and swivel holder 11 is provided an adjusting nut 19 which forms an abutment cooperating with the back 14 (FIG. 3) of swivel holder 11 and which determines the longitudinal position of feed tube 8 and which is adjustable by a corresponding adjustment of nut 18. Insulating bush 63 projects somewhat over the back of swivel holder 11 for the electrical insulation of nut 18.

The resiliently bendable wire feed tube 9 formed by a steel tension coil spring is axially supported by its end remote from coupling sleeve 35 on the end of hollow shaft portion 19 of drive shaft 15 remote from the torchhead. As the wire feed tube 9 can be resiliently bent out and is bent out as a flat loop within the hollow shaft portion 19 an axially directed spring tension is formed on coupling sleeve 35 which, by means of sleeve 35 and screw shank 17 of nozzle 8 which is screwed thereto presses its adjusting nut 18 against the back of swivel holder 11. In addition, this spring tension is transferred to the torchholder 4, longitudinal slide 5, its adjustment mechanism 12 and cross slide 6, so that in the axial direction of the spring tension any bearing play in the adjustment assembly is eliminated. An insulating bush 71 is inserted in oblong hole 59 (FIG. 2) and an insulating tube 72 in hollow shaft portion 19 for the electrical insulation of wire feed tube 9.

The burner head is located in a protective tube 25, which at the front is screwed to the boss 26 of drive shaft 15, 19 and on both sides has in each case a relatively large window 59, so that the adjustment assembly of torchhead 1 is readily accessible and the scales on the adjustment mechanisms can easily be read. Scale 47 (FIG. 1) of cross slide 6 is placed on a guide strip 44 screwed to the front plate 31 defining at the bottom the guidance slot for slide base 49 of cross slide 6. Cross slide 6 has a marking line 48, cooperating with scale 47. The scales for the axial setting of the torch, its swivel position and that of swivel holder 11 with respect to torch holder 4 are all provided on the same side of the adjustment assembly (FIG. 4). The scale 42 for the axial setting of the torch is formed on longitudinal slide 5, whilst the associated marking line 43 is located on the cross slide. Scale 40 for the swivel position of the torch is also formed on longitudinal slide 5 and cooperates with a corresponding marking line 41 on torchholder 4. Scale 38 for the swivelling position of filler wire nozzle 8 relative to the welding electrode is placed on one end face of swivel holder 11 and cooperates with an associated marking line 39 on torchholder 4.

Axial supports 28 (FIG. 2) are axially adjustably supported by means of a guide ring 27 on the front of protective tube 25. The axial supports 28 form stop members defining the axial spacing of the welding electrode with respect to a weld, e.g. for the frontal welding of the tubes of a tubular heat exchanger to its tube plate. The torchhead is centred on a centering mandrel inserted in the tube to be welded and this is screwed to a centering mandrel holder 29, screwed to the front cover 24 of the torchhead. Front cover 24 is connected in non-rotary manner by means of a spacing segment 51 (FIG. 2) to the front plate 31 of drive shaft 15, 19 of the torchhead and is mounted in rotary manner in a ballbearing in the front end of protective tube 25, so that it rotates with the torchhead about its rotation axis. As can be gathered from FIG. 8 front cover 24 has a front window 70 for the torch. One edge of window 70 runs parallel to the adjustment direction of cross slide 6 of the torch head and the swivel plane of torch holder 4. An additional scale 57 is provided on said edge with which cooperates a marking line 58 on torch holder 4 or an indicating tongue projecting therefrom or the tip of welding electrode 3 as an indicator. Thus, the radial spacing of the tip of welding electrode 3 with respect to the rotation axis of the torchhead can be directly read off at scale 57 if torchholder 4 is swung out of its neutral position and therefore the actual radial spacing from the electrode top to the rotation axis does not coincide with the value read from scale 47 (FIG. 1), which gives the radial spacing of swivel spindle 7 of torchholder 4. The position of the nozzle opening can also be read off scale 57 by taking bearings on the opening of said nozzle 8.

We claim:

1. An electrical welding gun comprising a rotary torchhead rotatable about a rotation axis by means of a drive shaft having a front plate, to which said torchhead is attached, a torchholder supporting a welding electrode, a wire feed tube for feeding a filler wire, said wire feed tube ending in a filler wire nozzle, and an adjustment assembly on said rotary torchhead for adjustment of the torchholder in a first adjustment direction parallel to the rotation axis of the torchhead by means of a longitudinal slide and in a second adjustment direction perpendicular to the rotation axis of the torchhead by means of a cross slide, for swivel adjustment of the torchholder about a first swivel axis perpendicular to the rotation axis of the torchhead and to said second adjustment direction by means of a first swivel spindle, for adjustment of the filler wire nozzle parallel to the rotation axis of the torchhead and perpendicular thereto, and for swivel adjustment of the filler wire nozzle about a second swivel axis perpendicular to the rotation axis of the torchhead and to said second adjustment direction by means of a second swivel spindle wherein the filler wire nozzle is held in a swivel holder which is swivellably adjustably supported on the torchholder by means of said second swivel spindle and the torchholder is swivellably adjustably supported on the longitudinal slide by means of said first swivel spindle and the longitudinal slide is adjustably guided in said first adjustment direction on the cross slide to be adjustable in said first adjustment direction by means of an adjusting means, the cross slide being adjustably guided in said front plate in an undercut guidance slot.

2. An electrical welding gun according to claim 1, wherein a spring means whose spring tension acts substantially parallel to the rotation axis of the torchhead is secured between the swivel holder of the filler wire nozzle and the drive shaft of the torchhead for eliminating all bearing plays of the adjustment assembly in a direction parallel to the rotation axis of the torchhead.

3. An electrical welding gun according to claim 1, wherein the filler wire nozzle has a shank passing through the swivel holder and being longitudinally adjustably guided therein perpendicular to said second swivel spindle.

4. An electrical welding gun according to claim 2, wherein the filler wire nozzle has a shank passing through the swivel holder and being longitudinally adjustably guided therein in a direction perpendicular to said second swivel spindle, said shank of the filler wire nozzle being a screw shank which is displaceably guided in said swivel holder and on which is screwed an adjusting nut, the filler wire nozzle under the tension of the spring means being pressed against the swivel holder.

5. An electrical welding gun according to claim 4, wherein said spring means is formed by the wire feed tube secured to the screw shank of the filler wire nozzle and constructed in a resiliently bendable manner, said drive shaft having a hollow shaft portion in which the wire feed tube is held by the screw shank of the filler wire nozzle to extend in a resiliently bent out manner within the hollow shaft portion of the drive shaft of the torchhead.

6. An electrical welding gun according to claim 1, wherein the adjustment means of the longitudinal slide has an eccentric disc arranged in a transverse slot of the longitudinal slide, said transverse slot extending perpendicular to said first adjustment direction, said eccentric disc having an eccentric pin projecting perpendicular to said first adjustment direction and to said second adjustment direction through a guidance slot extending in said first adjustment direction said eccentric pin being rotably supported in the cross slide.

7. An electrical welding gun according to claim 6, wherein a spring means whose spring tension acts substantially parallel to the rotation axis of the torchhead is secured between the swivel holder of the filler wire nozzle and the drive shaft of the torchhead for eliminating bearing plays of the adjustment assembly in a direction parallel to the rotation axis, said filler wire nozzle having a shank passing through the swivel holder and being longitudinally adjustably guided therein in a direction perpendicular to said second swivel spindle, said shank being a screw shank which is displaceably guided in said second swivel holder and on which is screwed an adjusting nut which is engaged by the spring means for pressing the filler wire nozzle against the swivel holder, said first swivel spindle of torchholder, the axis of the eccentric pin and the axis of the screw shank of the filler wire nozzle being located in a common plane.

8. An electrical welding gun according to claim 1 characterized in that a scale running parallel to said second adjustment direction is provided on a torch-side front cover of the welding gun rotatable with the torch-head for indexing adjustment position of the welding electrode along said second adjustment direction.

* * * * *